United States Patent
Suteerawanit

(10) Patent No.: US 12,256,726 B2
(45) Date of Patent: Mar. 25, 2025

(54) RODENT GLUE TRAP

(71) Applicant: Nick Suteerawanit, Los Angeles, CA (US)

(72) Inventor: Nick Suteerawanit, Los Angeles, CA (US)

( * ) Notice: Subject to any disclaimer, the term of this patent is extended or adjusted under 35 U.S.C. 154(b) by 0 days.

(21) Appl. No.: 18/234,628

(22) Filed: Aug. 16, 2023

(65) Prior Publication Data
US 2024/0397929 A1  Dec. 5, 2024

Related U.S. Application Data

(63) Continuation-in-part of application No. 18/204,825, filed on Jun. 1, 2023, now Pat. No. 11,937,593.

(51) Int. Cl.
*A01M 23/00* (2006.01)
*A01M 1/14* (2006.01)

(52) U.S. Cl.
CPC ................ *A01M 23/005* (2013.01)

(58) Field of Classification Search
CPC ...... A01M 23/005; A01M 1/14; A01M 25/00; A01M 25/002; A01M 25/004
USPC ............................................. 43/58, 114, 131
See application file for complete search history.

(56) References Cited

U.S. PATENT DOCUMENTS

| | | | | |
|---|---|---|---|---|
| 529,109 A * | 11/1894 | Burgess | ................. | A01M 1/103 43/121 |
| 544,183 A * | 8/1895 | Cook | .................... | A01M 1/103 43/121 |
| 554,616 A * | 2/1896 | Cook | .................... | A01M 1/103 43/121 |
| 812,761 A * | 2/1906 | Meier | ................... | A01M 1/103 43/65 |
| 868,514 A * | 10/1907 | Westerbeck | ......... | B65D 43/022 220/802 |
| 1,134,318 A * | 11/1915 | Deardoff | ............... | A01M 1/103 43/121 |
| 1,161,388 A * | 11/1915 | Johnson | ................ | A01M 1/103 43/115 |
| 1,321,360 A * | 11/1919 | Bright | ................. | A01M 25/004 43/131 |
| 1,485,867 A * | 3/1924 | Mooney | .................. | A01M 1/02 43/121 |

(Continued)

FOREIGN PATENT DOCUMENTS

| | | | | |
|---|---|---|---|---|
| CA | 1284582 C | * | 6/1991 | .......... A01M 23/005 |
| CA | 2324586 A1 | * | 4/2002 | .............. A01M 1/14 |

(Continued)

*Primary Examiner* — Darren W Ark
(74) *Attorney, Agent, or Firm* — AGK Patent & Trademark Law; Philip Y Kim

(57) ABSTRACT

A rodent glue trap includes a dark colored base having glue on a base floor, an overall height between 4.5 inches and 6 inches; and a plurality of entries through base side walls and base end walls. The entries are preferably between 1.75 inches and 2 inches in diameter. The entries are large enough for rodents to enter but not too large to let in too much light. The bottom of the entries have heights preferably at least 2.5 inches above the base floor and more preferably between 2.5 inches and 3 inches above the base floor. The height of the entries is sufficient to cause rodents to fall onto an stick to the glue. A lid resides on the base and may include additional entries into the trap.

3 Claims, 6 Drawing Sheets

(56) References Cited

U.S. PATENT DOCUMENTS

| | | | | |
|---|---|---|---|---|
| 1,774,387 A * | 8/1930 | Loibl | | A01M 1/2011 43/131 |
| 2,000,193 A * | 5/1935 | Schroder | | A01M 1/106 43/121 |
| 2,695,115 A * | 11/1954 | Roop | | B65D 21/0219 206/508 |
| 2,752,970 A * | 7/1956 | Tupper | | B65D 1/42 D9/425 |
| 2,964,871 A * | 12/1960 | Hoffman | | A01M 25/004 43/131 |
| 3,023,539 A * | 3/1962 | Emerson, Jr. | | A01M 1/145 43/113 |
| 3,122,857 A * | 3/1964 | Yates | | A01M 25/004 43/131 |
| 3,355,056 A * | 11/1967 | Fisch | | B65D 43/0218 220/802 |
| 3,398,478 A * | 8/1968 | Pearsall | | A01M 23/005 43/65 |
| 3,802,116 A * | 4/1974 | Meguro | | A01M 1/02 43/121 |
| 3,816,956 A * | 6/1974 | Sekula | | A01M 1/14 43/114 |
| 3,851,417 A * | 12/1974 | Wunsche | | A01M 1/02 43/121 |
| 3,908,302 A * | 9/1975 | Carr | | A01M 1/02 43/121 |
| 3,913,259 A * | 10/1975 | Nishimura | | A01M 1/02 43/121 |
| 3,940,874 A * | 3/1976 | Katsuda | | A01M 1/14 43/114 |
| 4,026,064 A * | 5/1977 | Baker | | A01M 25/004 43/131 |
| 4,030,233 A * | 6/1977 | Wunsche | | A01M 1/103 43/121 |
| 4,044,495 A * | 8/1977 | Nishimura | | A01M 1/14 43/121 |
| 4,161,079 A * | 7/1979 | Hill | | A01M 23/005 43/131 |
| 4,208,828 A * | 6/1980 | Hall | | A01M 1/02 43/121 |
| 4,214,400 A * | 7/1980 | Patmore | | A01M 1/14 43/121 |
| 4,217,722 A * | 8/1980 | McMullen | | A01M 1/14 43/121 |
| 4,228,613 A * | 10/1980 | Kalnasy | | A01M 25/004 43/131 |
| 4,281,471 A * | 8/1981 | Jenkins | | A01M 25/004 43/131 |
| 4,286,713 A * | 9/1981 | Marchais | | B65D 21/0217 206/508 |
| 4,364,194 A * | 12/1982 | Clark, Sr. | | A01M 25/004 43/131 |
| 4,395,842 A * | 8/1983 | Margulies | | A01M 1/14 43/121 |
| 4,541,198 A * | 9/1985 | Sherman | | A01M 25/004 43/131 |
| 4,552,307 A * | 11/1985 | Stedham | | A01M 29/12 239/57 |
| 4,709,503 A * | 12/1987 | McQueen | | A01M 1/14 43/121 |
| 4,709,504 A * | 12/1987 | Andric | | A01M 1/14 43/121 |
| 4,769,942 A * | 9/1988 | Copenhaver, Sr. | | A01M 25/004 43/61 |
| 4,815,231 A * | 3/1989 | McQueen | | A01M 1/14 43/121 |
| 4,819,371 A * | 4/1989 | Cohen | | A01M 1/2011 43/131 |
| 5,172,514 A * | 12/1992 | Weber | | A01M 1/02 43/132.1 |
| 5,238,681 A * | 8/1993 | Chang | | A01N 25/34 43/132.1 |
| 5,303,501 A * | 4/1994 | Seemann | | A01M 1/026 434/428 |
| 5,310,552 A * | 5/1994 | Gunner | | A01N 63/30 43/132.1 |
| 5,427,266 A * | 6/1995 | Yun | | B65D 79/02 220/780 |
| 5,427,784 A * | 6/1995 | Gunner | | A01N 63/30 43/132.1 |
| 5,438,792 A * | 8/1995 | Monett | | A01M 1/14 43/121 |
| 5,454,186 A * | 10/1995 | Gang | | A01M 1/02 43/114 |
| 5,572,825 A * | 11/1996 | Gehret | | A01M 1/02 229/120.11 |
| 5,771,628 A * | 6/1998 | Nobbs | | A01M 1/2011 43/132.1 |
| 5,868,268 A * | 2/1999 | Walker | | B65D 55/16 220/802 |
| 5,930,944 A * | 8/1999 | Knuppel | | A01M 31/002 43/121 |
| 5,979,108 A * | 11/1999 | Adams | | A01M 1/2011 43/131 |
| 6,389,738 B1 * | 5/2002 | Denny | | A01M 1/2011 43/58 |
| 6,571,509 B2 * | 6/2003 | Frasier | | A01M 25/004 43/131 |
| 6,618,983 B1 * | 9/2003 | Spragins | | A01M 1/2016 43/132.1 |
| 7,017,775 B2 * | 3/2006 | Zettle | | B65D 43/021 206/508 |
| 7,299,587 B1 * | 11/2007 | Metcalfe | | A01N 25/08 43/107 |
| 7,823,746 B1 * | 11/2010 | McCumber | | B65D 25/325 426/106 |
| 8,381,946 B2 * | 2/2013 | Everson | | B65D 43/162 220/837 |
| 8,418,871 B1 * | 4/2013 | LaMasney | | B65D 1/34 220/802 |
| 8,985,386 B2 * | 3/2015 | Everson | | B65D 43/162 220/839 |
| 10,595,524 B1 * | 3/2020 | Suteerawanit | | A01M 31/002 |
| 11,344,021 B1 * | 5/2022 | Suteerawanit | | A01M 1/02 |
| 11,937,593 B1 * | 3/2024 | Suteerawanit | | A01M 1/14 |
| 2002/0104255 A1 * | 8/2002 | Hobson | | A01M 1/14 43/114 |
| 2002/0104846 A1 * | 8/2002 | Rosenfeld | | B65D 1/10 206/508 |
| 2002/0178648 A1 * | 12/2002 | Frasier | | A01M 25/004 43/131 |
| 2003/0155365 A1 * | 8/2003 | Llorente Lecue | | B65D 43/021 220/802 |
| 2004/0200133 A1 * | 10/2004 | Townsend | | A01M 25/004 43/131 |
| 2004/0251257 A1 * | 12/2004 | Schultz | | B65D 81/3453 220/366.1 |
| 2005/0097808 A1 * | 5/2005 | Vorhies | | A01M 23/20 43/61 |
| 2005/0102889 A1 * | 5/2005 | Hoyes | | A01M 1/026 43/114 |
| 2005/0160659 A1 * | 7/2005 | Forehand | | A01M 1/106 43/107 |
| 2006/0053682 A1 * | 3/2006 | Goldstein | | A01M 23/08 43/67 |
| 2006/0283075 A1 * | 12/2006 | Feldhege | | A01M 1/02 43/121 |
| 2007/0107297 A1 * | 5/2007 | Wijenberg | | A01M 1/026 43/107 |
| 2010/0011655 A1 * | 1/2010 | Frisch | | A01M 1/14 43/114 |
| 2012/0279110 A1 * | 11/2012 | Finotello | | A01M 25/004 43/131 |
| 2013/0333273 A1 * | 12/2013 | Esculier | | A01M 23/005 43/131 |
| 2014/0220859 A1 * | 8/2014 | McCutchan | | A01M 1/02 119/416 |

(56) References Cited

U.S. PATENT DOCUMENTS

| | | | | |
|---|---|---|---|---|
| 2015/0021321 A1* | 1/2015 | Gosen | ............... | B65D 21/0204 |
| | | | | 220/802 |
| 2016/0106087 A1* | 4/2016 | Ng | ......................... | A01M 1/14 |
| | | | | 43/114 |
| 2017/0013821 A1* | 1/2017 | Brown | ..................... | A01M 1/14 |
| 2017/0215402 A1* | 8/2017 | Bertrand | ................ | A01M 1/12 |
| 2017/0245488 A1* | 8/2017 | Zhang | ................... | A23K 20/10 |
| 2018/0077917 A1* | 3/2018 | Mailleux | ................. | A01M 1/14 |
| 2018/0184635 A1* | 7/2018 | Studer | ...................... | A01M 1/04 |
| 2019/0183107 A1* | 6/2019 | Edevold | ................ | A01M 23/08 |
| 2020/0214279 A1* | 7/2020 | Tsai | ...................... | G06V 10/143 |
| 2020/0245605 A1* | 8/2020 | Vickery | ................. | A01M 1/14 |
| 2021/0169060 A1* | 6/2021 | Spangler | ................ | A01M 1/02 |
| 2021/0259231 A1* | 8/2021 | Akiba | ................... | A01M 1/103 |
| 2022/0192173 A1* | 6/2022 | Warthen | ................ | A01M 1/14 |
| 2022/0386585 A1* | 12/2022 | Mailleux | ............... | A01N 25/18 |
| 2024/0130353 A1* | 4/2024 | Bayne | ................ | A01M 23/005 |
| 2024/0397924 A1* | 12/2024 | Suteerawanit | ........ | A01M 1/103 |

FOREIGN PATENT DOCUMENTS

| | | | | |
|---|---|---|---|---|
| CA | 3068711 A1 | * | 7/2021 | |
| CN | 104247706 A | * | 12/2014 | |
| CN | 204104600 U | * | 1/2015 | |
| CN | 104642275 A | * | 5/2015 | |
| CN | 105961367 A | * | 9/2016 | |
| CN | 206137011 U | * | 5/2017 | |
| CN | 206196766 U | * | 5/2017 | |
| CN | 206324086 U | * | 7/2017 | |
| CN | 108391655 A | * | 8/2018 | |
| CN | 109042610 A | * | 12/2018 | ......... A01M 23/005 |
| CN | 210580657 U | * | 5/2020 | |
| CN | 211268315 U | * | 8/2020 | |
| CN | 212728570 U | * | 3/2021 | |
| CN | 217308848 U | * | 8/2022 | |
| DE | 2323514 A1 | * | 12/1973 | |
| DE | 29507823 U1 | * | 4/1996 | |
| DE | 20315618 U1 | * | 1/2004 | ......... A01M 23/005 |
| EP | 0281744 A2 | * | 9/1988 | |
| FR | 2971672 A1 | * | 8/2012 | ......... A01M 23/005 |
| JP | 2001037399 A | * | 2/2001 | |
| JP | 2006254923 A | * | 9/2006 | |
| JP | 2007159521 A | * | 6/2007 | |
| JP | 4078626 B2 | * | 4/2008 | ......... A01M 23/005 |
| JP | 3155614 U | * | 11/2009 | |
| JP | 2012060993 A | * | 3/2012 | |
| JP | 5088937 B2 | * | 12/2012 | |
| JP | 5574355 B1 | * | 8/2014 | |
| JP | 2014180219 A | * | 9/2014 | |
| JP | 2015139412 A | * | 8/2015 | |
| JP | 6309135 B1 | * | 4/2018 | |
| JP | 6383026 B2 | * | 8/2018 | |
| JP | 2018121566 A | * | 8/2018 | |
| JP | 6430725 B2 | * | 11/2018 | |
| JP | 2018174812 A | * | 11/2018 | |
| JP | 2018198589 A | * | 12/2018 | |
| JP | 2019013209 A | * | 1/2019 | |
| JP | 2019083801 A | * | 6/2019 | |
| JP | 2019126288 A | * | 8/2019 | |
| JP | 2019170203 A | * | 10/2019 | |
| JP | 2019170204 A | * | 10/2019 | |
| JP | 2020110072 A | * | 7/2020 | |
| JP | 2020115819 A | * | 8/2020 | |
| JP | 2020171268 A | * | 10/2020 | |
| JP | 2021114922 A | * | 8/2021 | |
| JP | 2023114949 A | * | 8/2023 | |
| KR | 20030021227 A | * | 3/2003 | |
| KR | 20100002340 U | * | 3/2003 | |
| KR | 100592353 B1 | * | 6/2006 | |
| KR | 200421240 Y1 | * | 7/2006 | |
| KR | 100772973 B1 | * | 11/2007 | |
| KR | 20080098275 A | * | 11/2008 | |
| KR | 20080100721 A | * | 11/2008 | |
| KR | 20080100722 A | * | 11/2008 | |
| KR | 100871428 B1 | * | 12/2008 | |
| KR | 100877557 B1 | * | 1/2009 | |
| KR | 20090012801 A | * | 2/2009 | |
| KR | 20090032253 A | * | 4/2009 | |
| KR | 20090056761 A | * | 6/2009 | |
| KR | 100912225 B1 | * | 8/2009 | |
| KR | 20090008154 U | * | 8/2009 | |
| KR | 20100007491 A | * | 1/2010 | |
| KR | 20120003031 U | * | 5/2012 | |
| KR | 20120090222 A | * | 8/2012 | |
| KR | 200463497 Y1 | * | 11/2012 | |
| KR | 101361181 B1 | * | 2/2014 | |
| KR | 101518170 B1 | * | 5/2015 | |
| KR | 20160150544 A | * | 12/2016 | |
| RU | 2131188 C1 | * | 6/1999 | |
| WO | WO-9310661 A1 | * | 6/1993 | ............. A01M 1/14 |
| WO | WO-9622684 A1 | * | 8/1996 | ............. A01M 1/02 |
| WO | WO-9811775 A1 | * | 3/1998 | ......... A01M 1/2005 |
| WO | WO-02056679 A2 | * | 7/2002 | ............. A01M 1/14 |
| WO | WO-2004098279 A2 | * | 11/2004 | ............. A01M 1/02 |
| WO | WO-2007059075 A1 | * | 5/2007 | ............. A01M 1/02 |
| WO | WO-2009125753 A1 | * | 10/2009 | ......... A01M 23/005 |
| WO | WO-2012093369 A2 | * | 7/2012 | ............. A01M 23/00 |
| WO | WO-2015129976 A1 | * | 9/2015 | ............. A01M 1/14 |
| WO | WO-2016081865 A1 | * | 5/2016 | ......... A01M 23/005 |
| WO | WO-2019126153 A1 | * | 6/2019 | ......... A01M 23/005 |
| WO | WO-2019181881 A1 | * | 9/2019 | |
| WO | WO-2019198931 A1 | * | 10/2019 | ............. A01M 1/02 |
| WO | WO-2020009032 A1 | * | 1/2020 | ............. A01M 1/02 |
| WO | WO-2020086716 A1 | * | 4/2020 | ............. A01M 1/14 |

\* cited by examiner

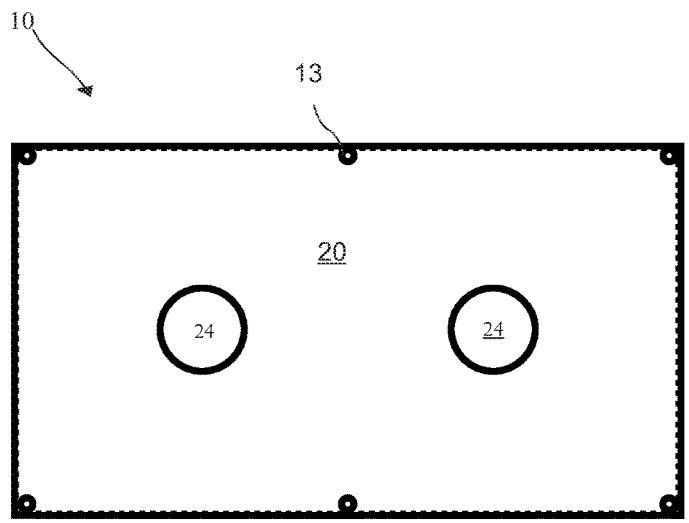
FIG. 3C
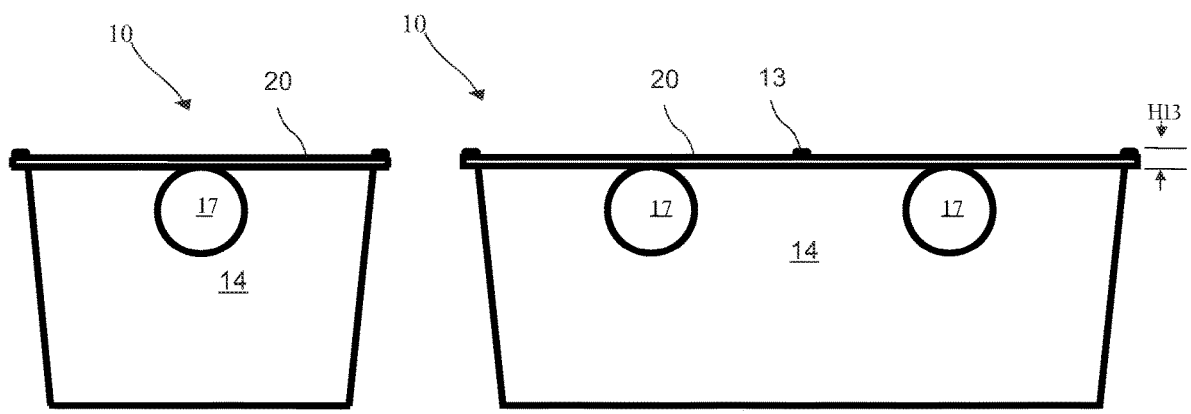
FIG. 3B
FIG. 3A

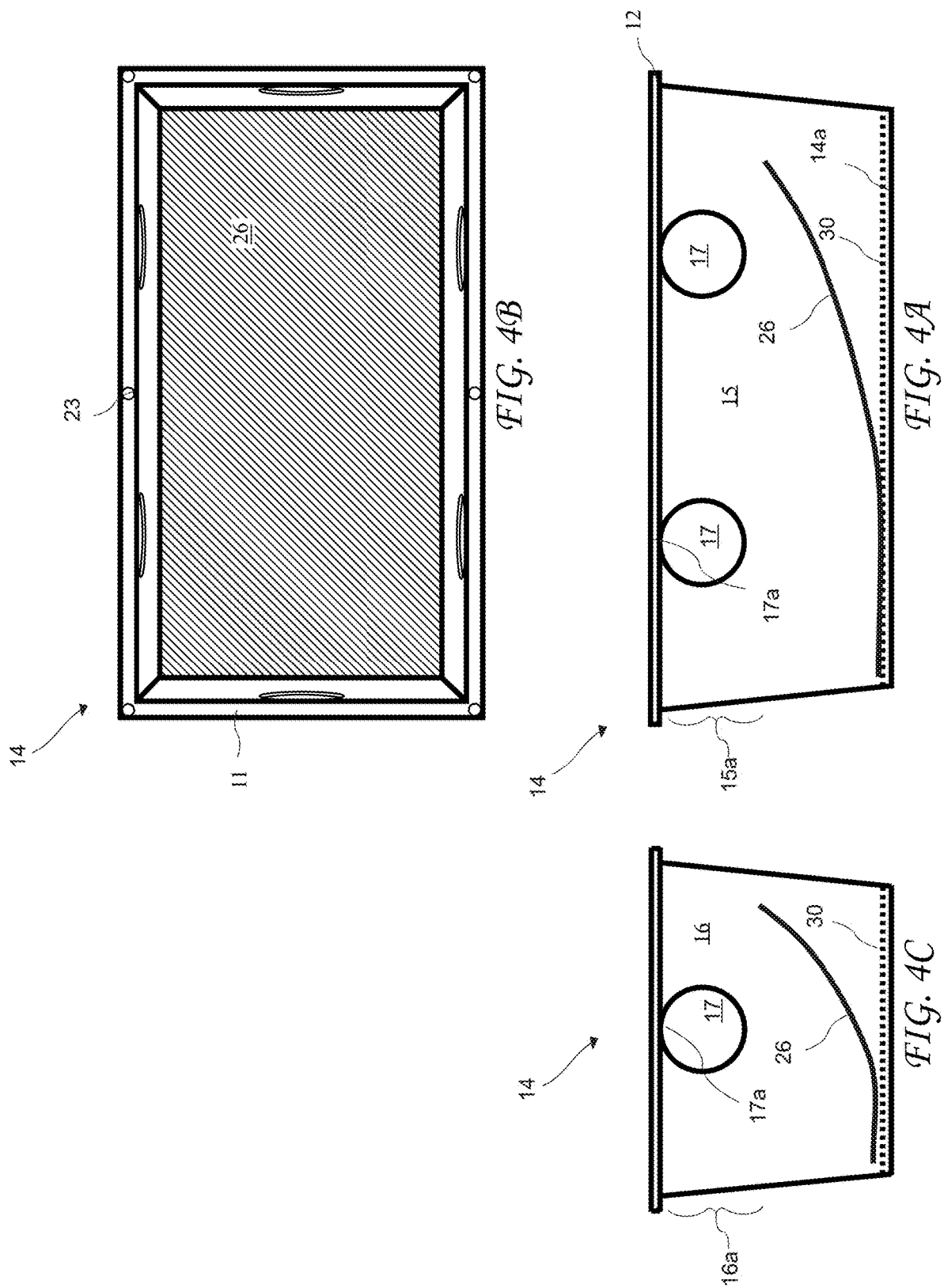

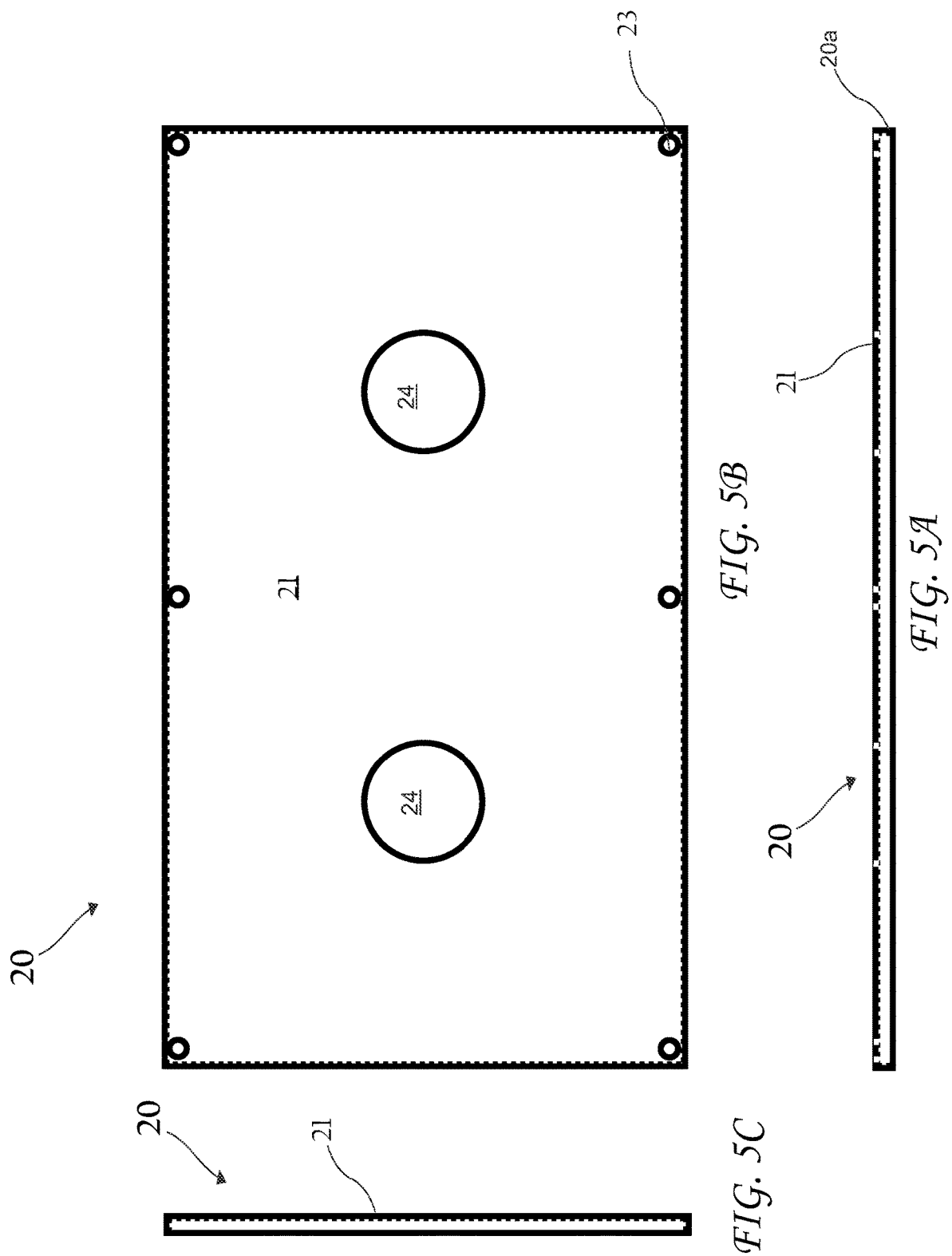

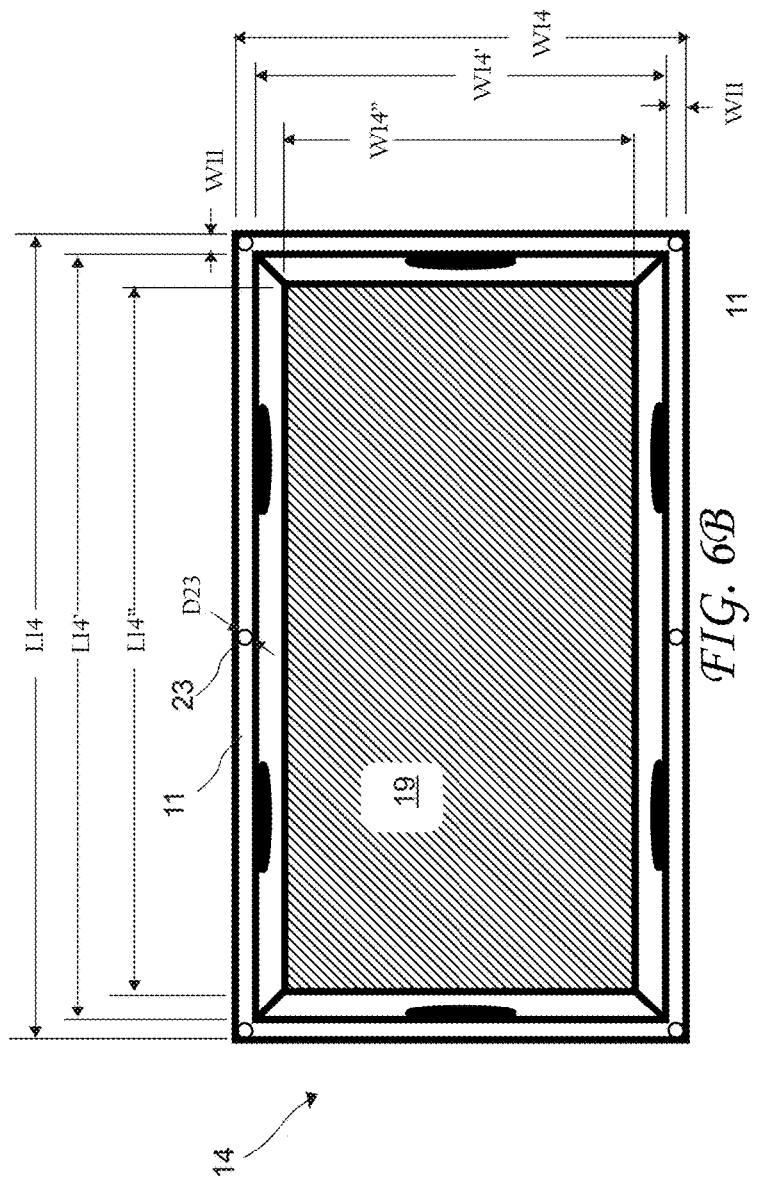
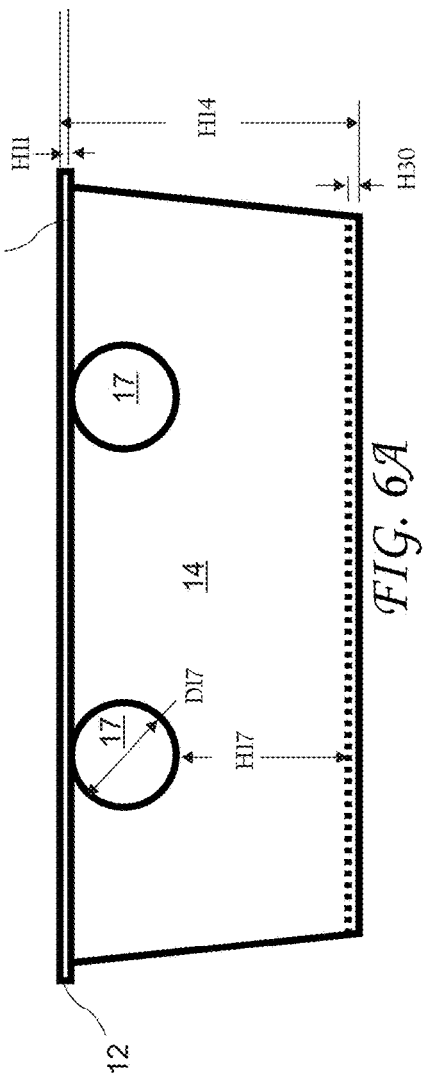
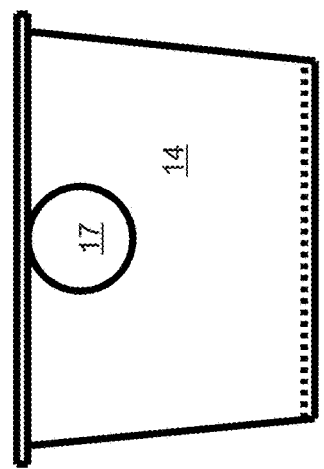
FIG. 6A
FIG. 6B
FIG. 6C

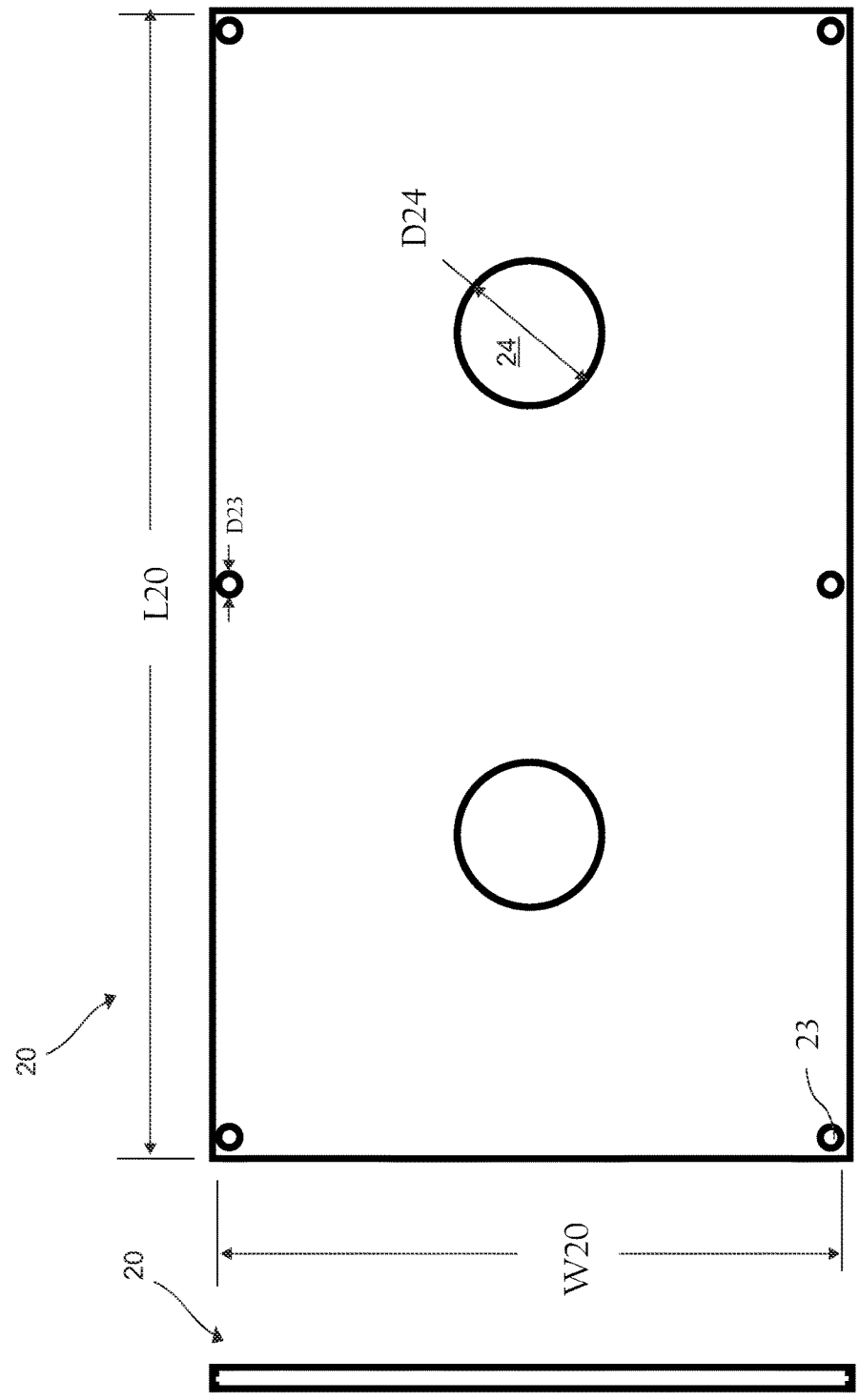
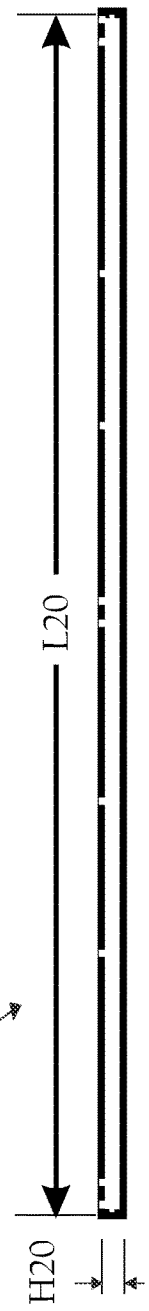
FIG. 7A
FIG. 7B
FIG. 7C

RODENT GLUE TRAP

CROSS-REFERENCE TO RELATED APPLICATIONS

The present application is a Continuation In Part of U.S. patent application Ser. No. 18/204,825 filed Jun. 1, 2023, which application is incorporated in its entirety herein by reference.

BACKGROUND OF THE INVENTION

The present invention relates to rodent traps and in particular to a rodent glue trap capturing multiple rodents.

Rodents can be found in and around every town and farm in the United States (U.S.) and it is estimated that there is one rodent for every person living in the U.S., and rodents have followed humans to almost all parts of the world. Rodents are so closely linked to humans they are called domestic rodents and humans supply their three basic needs: food; shelter; and water.

Rodents are a threat to health, and they interfere with our economic and physical well being. Rodents are destructive pests and serious safety hazards, rodents start fires by gnawing on electric cables, rodents eat large amounts of food, and rodents contaminate even more with food their urine, feces, and hair, and at least 20 percent of the world's food is eaten or contaminated by rodents each year. Rodents damage structures, books, furniture, even appliances, through gnawing and burrowing. Rodents spread disease to humans and other animals through their bite, by transporting fleas, lice, mites and ticks, and by leaving their droppings in food and other materials that humans contact. Rodents are vectors for bubonic plague, rat bite fever, leptospirosis, hantavirus, trichinosis, infectious jaundice, rat mite dermatitis, salmonellosis, pulmonary fever, and typhus. Mice have been linked to asthma, and rodents may bite babies in their cribs because the smell of milk or other food on the baby is attractive to a rodent looking for food.

Rodents can be found in our homes, supermarkets, restaurants, livestock pens, and farm fields. Warehouses, grain mills, elevators, silos and corncribs are especially vulnerable to rodent infestation. Rodents will eat anything humans or livestock eat. Rats in particular are active at night and are seldom seen during the day except when populations are exceedingly large. Rodents can crawl through very small crevices, which makes it hard to confine their movement. Even if rodents are unseen, they may be heard moving after dark. A pet may be aware of a lurking rodent, however cats and dogs are not much of a deterrent to rodents.

Rodents find their way into approximately 21 million U.S. homes each winter. According to a survey by the National Pest Management Association (NPMA), nearly one-third of Americans have had a rodent problem in their home. Different types of rodents typically invade homes during the fall and winter in search of food and shelter as the climate cools, although rodents can still pose problems throughout the rest of the year. The majority of homeowners surveyed reported rodent sightings in the kitchen, as well as the basement and living room to lesser extent.

Rodent problems inside a home or business can pose a significant threat to both health and property. Various types of common rodents are known to spread Salmonella and other bacteria. Rodents are also capable of triggering allergies and asthma attacks. Rodents can also carry disease-causing parasites, such as ticks, fleas and lice. In addition to these health threats, rodents are known to damage drywall as well as wood and can also chew through electrical wires, increasing the risk of electrical fires.

Proper rodent prevention measures and awareness are essential to keep both people and property safe. Rats can squeeze through entries the size of a quarter while mice can fit through holes as small as a quarter of an inch in width. Once inside, females can breed quickly. For example, a single female mouse can have as many as twelve young every three weeks, allowing infestations to quickly grow.

Deer mice are found throughout the United States. Deer mice prefer to nest in rural areas in places like old fence posts, tree hollows and log piles. Deer mice are rarely a problem in residential settings, but they can wander indoors during the winter months while searching for shelter and food. Deer mice will often take up residence in sheds, barns or cabins during the off season. Deer mice are the most common carrier of hantavirus, a group of viruses spread by rodents that can cause kidney, blood or respiratory ailments and can sometimes be fatal in humans. The virus is transmitted primarily by the inhalation of dust particles contaminated with the urine, feces or saliva of infected deer mice.

House mice are the most commonly encountered rodent species and can be found throughout the United States. House mice typically nest in dark, secluded areas inside of structures. House mice are excellent climbers and can jump up to a foot in height, allowing them to reach isolated or withdrawn areas. House mice can cause significant property damage by chewing through materials like drywall and insulation. Additionally, house mice have been known to spark electrical fires by gnawing on wires inside homes. House mice can also pose serious health threats, capable of contaminating stored food and spreading diseases such as Salmonella. House mice weight is typically 40-45 grams.

Norway rats are widespread and can be found throughout the United States. Norway rats are primarily nocturnal and often burrow into piles of garbage or underneath concrete slabs. Norway rats tends to enter homes in the fall when outdoor food sources become scarce, typically nesting in basements, crawlspaces and other undisturbed dwellings once inside. Norway rats can cause serious property damage by gnawing through various materials, including plastic and lead pipes. Norway rats are also vectors of disease, including the plague, jaundice, rat-bite fever and cowpox virus. Additionally, Norway rats can bring fleas and mites inside the home.

Roof rats can be found throughout the U.S. coastal states and southern third of the country. Roof rats typically live in colonies and prefer to nest in the upper areas of structures or trees. Historically, roof rats and the fleas they carry have been associated with the bubonic plague. Although cases are rare, roof rats can also spread diseases like typhus, jaundice and trichinosis.

The Black Death killed as many as 25 million people in Europe in the 1300s. Scientists believe the Black Death (also known as the Pestilence, the Great Mortality or the Plague, or bacterium *Yersinia pestis*) was a bubonic plague pandemic occurring in Afro-Eurasia from 1346 to 1353. It is the most fatal pandemic recorded in human history, causing the death of 75-200 million people in Eurasia and North Africa, peaking in Europe from 1347 to 1351. *Yersinia pestis* typically infects the Oriental rat flea, which in turn infects small rodents such as mice, rodents and squirrels. As their rodent hosts die, infected fleas seek and bite humans.

Rats are naturally nocturnal creatures, have poor eyesight, and can best see blues as blurry edges, and rats and mice are believed to be color blind. Rats use their limited sight and other senses to navigate the environment, find food, and recognize one another in the dark.

The most common way to deal with rodents is using poison. However, the poison may be reached by children, and other animals eating a poisoned rodent may be affected or killed by the poison. A rodent killed by poison may expire in a wall or attic space and produce an extremely noxious odor of sulfur dioxides, methane, and other noxious gases lasting for days or weeks and attracting flies into a home.

Some traps are capable of trapping and killing multiple rodents and glue traps are sometimes used with some success, however, rodents often step onto the glue, recognize the danger, and get away.

The extensive damage caused by rodents is evidence that better traps, not requiring poison, are needed.

BRIEF SUMMARY OF THE INVENTION

The present invention addresses the above and other needs by providing a rodent glue trap with entries large enough for rodents to enter, but limiting light entering the trap. The entries are elevated above the floor to prevent the rodents from feeling the glue before entering the trap.

In accordance with one aspect of the invention, there is provided a rodent glue trap having entries large enough for rodents to enter but not too large to let in too much light. Rodents prefer dark areas, and limiting the amount of light entering the trap attracts the rodents. For example an entries diameter between 1.75 inches and 2 inches, and preferably 1.75 inches, allows the rodents to enter but limits light entering the trap.

In accordance with another aspect of the invention, there is provided a rodent glue trap having entries high enough to cause the rodents to fall onto the glue upon entering the trap, making it more likely to stick to the glue. The bottom of the entries have heights between 2.5 inches and 3 inches, and preferably 3 inches above the floor.

In accordance with yet another aspect of the invention, there is provided a rodent glue trap having the benefits of 1) no chemical involvement, which is safe for pets and children; 2) simple application: peel a paper layer off of the glue, add bait, put a lid on the base, and place the trap in the infested location; and 3) inexpensive.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3A is a side view of the glue trap according to the present invention.

FIG. 3B is an end view of the glue trap according to the present invention.

FIG. 3C is a top view of the glue trap according to the present invention.

FIG. 4A is a side view of the base of the glue trap according to the present invention.

FIG. 4B is a top view of the base of the glue trap according to the present invention.

FIG. 4C is a end view of the base of the glue trap according to the present invention.

FIG. 5A is a side view of the lid of the glue trap according to the present invention.

FIG. 5B is a top view of the lid of the glue trap according to the present invention.

FIG. 5C is a end view of the lid of the glue trap according to the present invention.

FIG. 6A is a dimensioned side view of the base of the glue trap according to the present invention.

FIG. 6B is a dimensioned top view of the base of the glue trap according to the present invention.

FIG. 6C is a dimensioned end view of the base of the glue trap according to the present invention.

FIG. 7A is a dimensioned side view of the lid of the glue trap according to the present invention.

FIG. 7B is a dimensioned top view of the lid of the glue trap according to the present invention.

FIG. 7C is a dimensioned end view of the lid of the glue trap according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
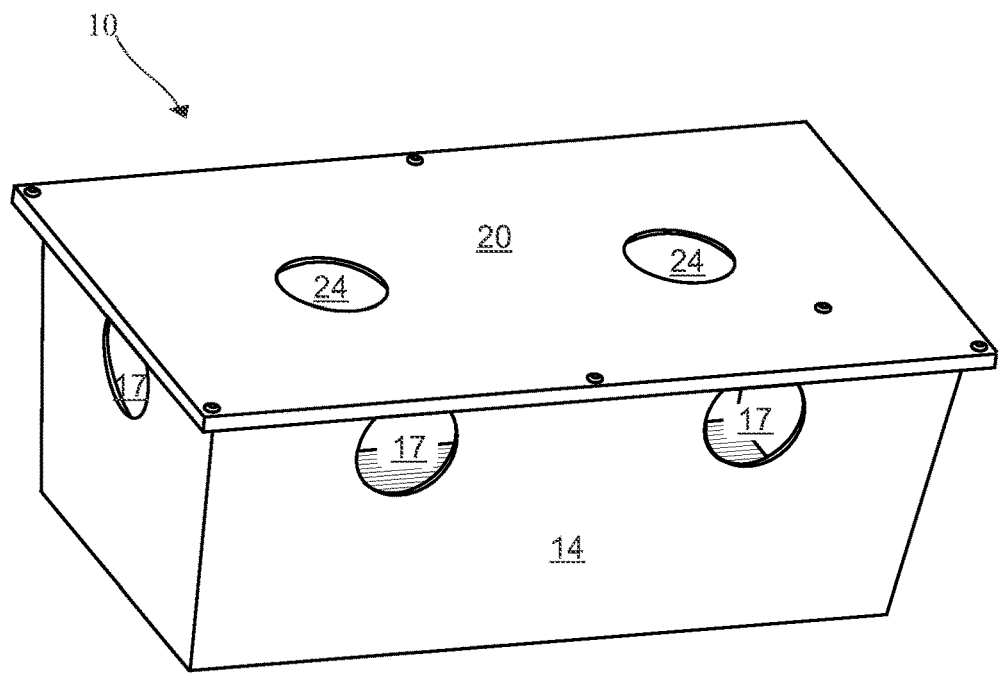
FIG. 1 is a perspective view of a glue trap according to the present invention.
Figure 2:
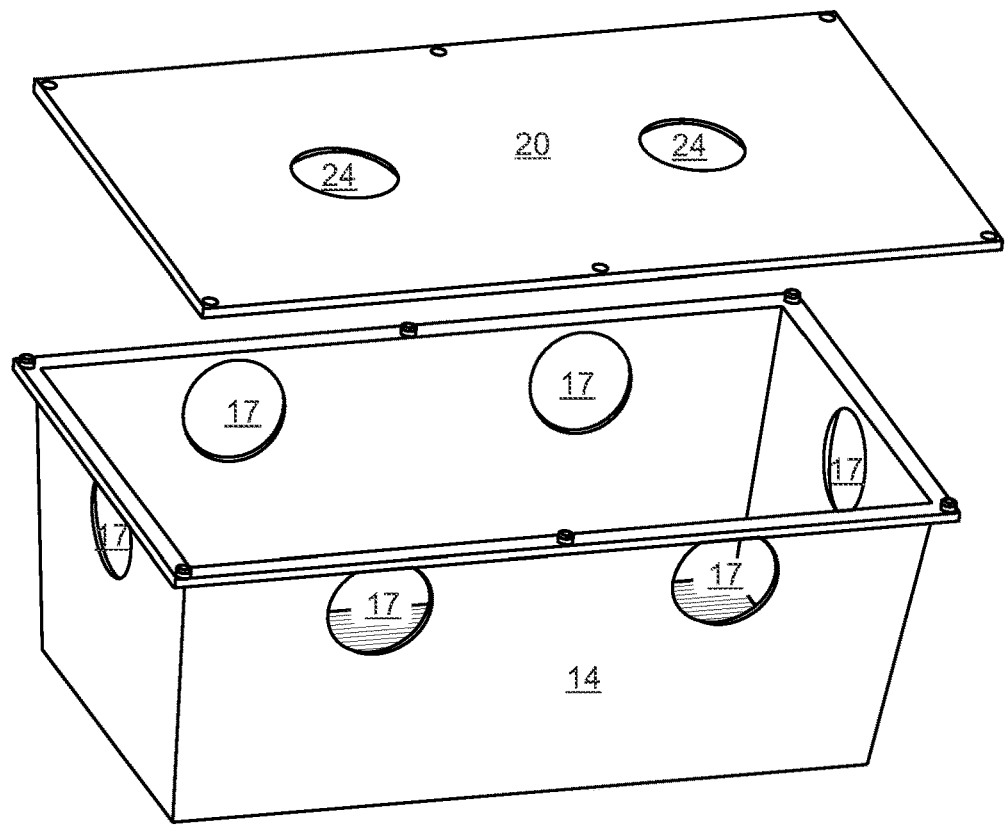
FIG. 2 is a exploded perspective view of the glue trap according to the present invention.

A perspective view of a glue trap 10 is shown in FIG. 1 and an exploded view of the glue trap 10 is shown in FIG. 2. The glue trap 10 comprising a base 14 and a lid 20. The base 14 includes entries 17 and 24 allowing rodents to enter the glue trap 10. The base 14 is tapered for improved storage and delivery.

FIG. 3A is a side view of the glue trap 10, FIG. 3B is an end view of the glue trap 10, and FIG. 3C is a top view of the glue trap 10. A plurality of fasteners 13 attach the lid 20 to the base 14. The overall height of the fasteners 13 is H13. The height H13 is preferably between ⅛ inches and ¼ inches, and more preferably is about 3/16 inches and most preferably is 3/16 inches.

A top view of the base 14 of the glue trap 10 is shown in FIG. 4B, a side view of the base 14 is shown in FIG. 4A, and an end view of the base 14 is shown in FIG. 4C. The base 14 includes an outward reaching top rim 11 having a rim edge 12. A glue layer 30 covers a top surface of a floor 14a of the base 14. A removable cover sheet 26 preferably resides over the glue layer 30. A plurality of base entries 17 are through side walls 15 and end walls 16 of the base 14. The top rim 11 of the base 14 reaches out from tops of the side walls 15 and end walls 16 and includes a plurality of fastener holes 23. The entries 17 are in top halves 15a and 16a sides of the sides 15 and ends 16 respectively, and tops 17a of the openings 17 are proximal to the lid 20.

A top view of the lid 20 of the glue trap 10 is shown in FIG. 5B, a side view of the lid 20 is shown in FIG. 5A, and an end view of lid 20 is shown in FIG. 5C. The lid 20 includes a top cover 21, a lid edge 20a reaching down from outside edges of the top cover 21, a plurality of fastener holes 23, and top entries 24.

A dimensioned top view of the base 14 is shown in FIG. 6B, a dimensioned side view of the base 14 is shown in FIG. 6A, and a dimensioned end view of the base 14 is shown in FIG. 6C. The base 14, including the top rim 11, has an overall length L14, overall width W14 and a height H14. An interior 19 of the base 14 has a top length L14' and a top width W14', a bottom length L14", and bottom width W14". The entries 17 have a diameter D17 bottoms of the entries 17 and are preferably at the same height H17 above the base floor 14a. The width of the rim 11 is W11 and the height (or thickness) of the rim edge 12 of the rim 11 is H11. The fastener holes 23 in the rim 11 have a diameter D23. The height of the glue layer 30 from the floor is H30.

The length L14 is preferably between 13 inches and 15 inches, and more preferably about 13.5 inches, and most preferably is 13.5 inches. The length L14' is preferably between 12 inches and 14 inches and more preferably about 13 inches, and most preferably is 13 inches. The length L14" is preferably between 10 inches and 12 inches, and more preferably is about 11 inches, and most preferably is 11 inches.

The width W14 is preferably between 7 inches and 9 inches, and more preferably is about 8 inches, and most preferably is 8 inches. The width W14' is preferably between 6 inches and 8 inches, and more preferably is about 7 inches, and most preferably is 7 inches. The width W14" is preferably between 5 inches and 7 inches, and more preferably is about 6 inches, and most preferably is 6 inches.

The height H14 is preferably between 4½ and 6 inches, and more preferably is about 5 inches and most preferably is 5 inches.

The width W11 of the rim 11 is preferably between ¼ inches and ½ inches, and more preferably is about ⅜ inches, and most preferably is ⅜ inches. The height H11 is preferably between ⅛ inches and ¼ inches, and more preferably is about 3/16 inches and most preferably is 3/16 inches. The diameter D23 is preferably between 3/16 inches and ⅜ inches and more about ¼ inches and most preferably is ¼ inches.

The height H17 is preferably between 2.5 inches and 3 inches, and more preferably is about 3 inches and most preferably is 3 inches. The diameter D17 is preferably between 1.75 inches and 2 inches and more about 1.75 inches and most preferably is 1.75 inches.

The height H30 is preferably between 3/16 inches and ⅜ inches, and more preferably is about ⅛ inches and most preferably is ⅛ inches.

It is important to have the smallest diameter D17 entries 17 for the rodents to enter the glue trap 10 because the rodents like small cracks and crevices which make rodents feel safe for hiding and for breeding. The diameter D17 of the entries 17 allows the rodents to enter the glue trap 10 while providing a darker interior. Rodents are nocturnal that prefer dark environments making them more likely to enter the dark interior.

Bottom of entries 17 have heights H17 above the floor 14. The height H17 of the entries 17 is important because if the entries 17 are too low, the first rodents to enter the glue trap 10 may immediately contact the glue with front legs before completely entering the glue trap 10 and block the entries 17, preventing additional rodents from entering the glue trap 10. The height H17 causes rodents to fall into the trap 10 and become stuck to the glue 30.

A dimensioned top view of the lid 20 of the glue trap 10 is shown in FIG. 7B, a dimensioned side view of the lid 20 is shown in FIG. 7A, and an end view of the lid 20 is shown in FIG. 7C. The lid 20 has an overall length L20, and an overall height H20, and an overall width W20. The fastener holes 23 have a diameter D23 and the top entries 24 have a diameter D24.

The length L20 is preferably between 13 inches and 15 inches, and more preferably about 13.5 inches, and most preferably is 13.5 inches. The width W20 is preferably between 7 inches and 9 inches, and more preferably about 8 inches, and most preferably is 8 inches. The height H20 is preferably between 3/16 inches and ⅜ inches, and more preferably about ¼ inches and most preferably is ¼ inches.

The diameter D23 is preferably between 3/16 inches and ⅜ inches and more about ¼ inches and most preferably is ¼ inches. The diameter D24 is preferably between 1.75 inches and 2 inches and more about 1.75 inches and most preferably is 1.75 inches.

The color of the glue trap 10 is preferably blue, green or a dark color. Nocturnal mammals like the rodent prefer dark and small cracks and crevices for harborage.

While the invention herein disclosed has been described by means of specific embodiments and applications thereof, numerous modifications and variations could be made thereto by those skilled in the art without departing from the scope of the invention set forth in the claims.

I claim:

1. A rodent glue trap comprising:
    a base;
    a base floor of the base;
    side walls of the base;
    a base top of the base opposite to the base floor;
    a base interior between the base floor and the base top;
    a plurality of entries through the side walls, the entries have a diameter between 1.75 inches and 2 inches and an entries bottom height between 2.5 inches and 3 inches above the base floor;
    a glue layer on the base floor; and
    a lid configured to attach to the base top;
    a base top rim surrounding the base top, the base top rim reaching out from the base interior; and
    wherein the base top rim reaches about ⅜ of an inch out from the base interior.

2. A rodent glue trap comprising:
    a base having an overall length between 13 inches and 15 inches, an overall width between 7 inches and 9 inches, and an overall height between 4.5 inches and 6 inches;
    a base floor of the base;
    a base top opposite to the base floor;
    a base interior between the base floor and the base top;
    a base top rim surrounding the base top, the base top rim is about ⅜ of an inch out from the base interior;
    four side walls of the base, the side walls tapering smaller from the base top to the base floor;
    a plurality of entries through the side walls, the entries have a diameter between 1.75 inches and 2 inches and bottoms of the entries residing between 2.5 inches and 3 inches above the base floor;
    a glue layer on the base floor;
    a removable glue cover sheet residing on the glue layer before use; and
    a lid configured to attach to the base top.

3. A rodent glue trap comprising:
    a base having an overall length of 13.5 inches, an overall width of 8 inches, and a height of 5 inches;
    a base floor of the base;
    a base top opposite to the base floor;

a base interior having a length of 13 inches at the base top and 11 inches at the base floor and a width of 7 inches at the base top and 6 inches at the base floor;

a base top rim surrounding the base top, the base top rim reaching ⅜ of an inch out from the base interior;

four side walls of the base, the side walls tapering smaller from the base top to the base floor;

a plurality of entries through the side walls, the entries have a diameter of 1.75 inches and bottoms of the entries residing 3 inches above the base floor;

a removable and replaceable glue layer on the base floor;

a removable glue cover sheet residing on the glue layer before use; and a lid configured to attach to the base top.

\* \* \* \* \*